United States Patent [19]

Rosenfeld et al.

[11] 4,398,717
[45] Aug. 16, 1983

[54] ELECTRONIC BOXING GAME

[76] Inventors: Jon P. Rosenfeld, 32 Oakland Ave.; Alfred C. Mecklenburg, 11 Coolidge Rd., both of Arlington, Mass. 02174

[21] Appl. No.: 284,124

[22] Filed: Jul. 16, 1981

[51] Int. Cl.³ .............................................. A63F 9/00
[52] U.S. Cl. .............................. 273/85 G; 273/1 GC
[58] Field of Search ................. 273/DIG. 28, 88, 1 E, 273/1 GC, 85 G, 313, 94; 272/86

[56] References Cited

U.S. PATENT DOCUMENTS

| | | | |
|---|---|---|---|
| 3,637,212 | 1/1972 | Hurley | 273/85 G |
| 4,090,712 | 5/1978 | Shields | 273/85 R |
| 4,241,925 | 12/1980 | Watanabe | 273/1 GC |
| 4,249,735 | 2/1981 | Bromley | 273/94 |

OTHER PUBLICATIONS

*101 Basic Computer Games,* Digital Equipment Corporation, Maynard, Mass., 1975, pp. 26–28.

Primary Examiner—Vance Y. Hum
Assistant Examiner—Mary Ann Stoll

[57] ABSTRACT

An electronic boxing game provides a display panel of LEDs arranged in two rows of body symbols and three rows of arm symbols. A body-symbol LED can be actuated to represent the position of a simulated boxer, and arm-symbol LEDs can be activated individually to represent blocks or in sequence to represent punches. A punch stopped by a block is prevented from having its full effect, and a successful punch results in simulated staggering, knockdowns, and knockouts.

26 Claims, 17 Drawing Figures

ELECTRONIC BOXING GAME

BACKGROUND OF THE INVENTION

The present invention is directed to electronic games, particularly those of the type intended to simulate a boxing match.

The popularity of an electronic game depends to a great extent on the play value provided by it. Factors such as the variety of situations presented and the challenge provided to the player are thought to contribute to play value, and it has been found that it is best if the game simulates a game or other contest already known, such as a game of football or a battle between combatants.

The more popular team games have lended themselves to simulation in electronic games having considerable play value. One of the reasons is that American football, for instance, employs a relatively large number of players, and the number of play situations is accordingly fairly high.

However, individual contests such as boxing have also been simulated in electronic games, and attempts have been made to provide such games with the variety of play situations required to make an engaging contest. In one boxing game, for instance, the operator can control the various stances of a simulated boxer and can also cause punches to be thrown at various heights.

An object of the present invention is to achieve significant play value as a boxing-type game by providing numerous play situations and possible actions to be taken by the human player while at the same time employing simulation that involves strategy strongly analogous to that involved in actual boxing.

SUMMARY OF THE INVENTION

The foregoing and related objects are achieved in a self-contained electronic device for simulating boxing or the like. The game includes a housing on which a display panel is provided. Manually operable control elements are included, and status-information means and operational circuit means are provided in the housing.

The display panel provides a visual simulation of a boxing ring. It is operable by application of electrical signals to it to display a pair of opposing boxer symbols. Each boxer symbol includes a body portion, and arm symbols of the boxer symbols can be displayed extending from the body portion. Display of arm symbols is provided in both punching and blocking modes.

The status-information means is operable by application of electrical signals to it to display status information. The operational circuit means is electrically connected for application of electrical signals to the display panel. The operational circuit means is operable to transmit electrical signals to the display panel to display the body portions of the boxer symbols, move them about the simulated ring, and display the arm symbols extending from the body portions of the boxer symbols in the punching mode. It also transmits electrical signals to display an arm symbol extending in the blocking mode from at least one of the body portions.

The operational circuit means detects a simulated hit on the body portion of one boxer symbol by the arm symbol of another boxer symbol during a simulated punch to detect a simulated hit. In response, it transmits signals to the display panel to present an indication of the simulated hit. It also detects the simulated interruption of a punching arm symbol from one boxer symbol by a blocking arm symbol from another boxer symbol to prevent display of a simulated hit.

Electrical connections are provided for transmission of signals from the operational circuit means to the status-information means. The operational circuit means monitors the simulated action to record information concerning the status of the simulated match, and it transmits signals to the status-information means to display the status information.

The manually operable control elements are electrically connected for transmission of electrical signals to the operational circuit means upon manual operation of the manually operable control elements by a player of the game. By these signals, the player operates the operational circuit means to move at least one of the boxer symbols about the simulated ring under his manual control. Arm display for the manually controlled boxer is provided in both the punching mode and the blocking mode under manual control of the player. As a result, the player is able to move boxer symbols about the simulated ring under manual control and to selectively cause simulated punches and blocks.

Preferably, the display panel is operable to display a pair of arm symbols for each boxer symbol in separate positions relative to the body portion so that left and right arms can be simulated. One of the left and right arm symbols of each boxer symbol can conveniently be displayed in only the punching mode while the other arm symbol of each is displayed only in the blocking mode. In the preferred embodiment, the operational circuit means prevents simultaneous display of the arm symbols of a single boxer in both the punching and blocking modes.

The display panel may include a body row of visual-image-producing devices and a pair of arm rows of visual-image-producing devices disposed at opposite sides of the body row and extending substantially parallel to it. The operational circuit means is operable to activate the visual-image-producing devices in the body row for simulation of body portions of the boxer symbols. It is also operable to activate visual-image-producing devices in the arm row adjacent to visual-image-producing devices in the body row to simulate arms of the simulated boxers whose body portions are simulated by the activated visual-image-producing devices of the body row. The operational circuit means transmits signals to the display panel to activate visual-image-producing devices of the arm rows adjacent activated visual-image-producing devices of the body row to simulate punches and blocks by the blockers whose body portions are simulated by the activated devices of the body row. The operational circuit means detects the activation, adjacent one boxer's body portion, of visual-image-producing devices simulating punches from the other simulated boxer to detect simulated hits on the one simulated boxer. Realistic punch simulation can be provided by activation of a sequence of adjacent visual-image-producing devices in an arm row, blocks being simulated by activation of at least one visual-image-producing device in an arm row.

In the illustrated embodiment, the control panel includes at least one punch button and one block button. The arm is displayed in the punching mode momentarily in response to each operation of the punch button, and an arm symbol is displayed in the blocking mode continuously during continuous depression of the block button, at least until successful blocking of a punch. A blocked punch may be detected by detecting the activation of a visual-image-producing device simulating a block in a sequence of visual-image-producing devices simulating a punch.

The display panel in the illustrated embodiment is operable by application of electrical signals to it to simulate a knockdown of the simulated boxer symbol. The operational circuit means transmits electrical signals to the display panel for knockdown simulation upon detection of a hit only if a predetermined number of hits has been scored on a simulated boxer within a predetermined time duration. Furthermore, a knockdown of a given boxer is only simulated if the predetermined number of hits has been scored against that boxer within a predetermined time without a hit being scored on the other boxer.

Further realism results if the operational circuit means only transmits signals to the display panel to simulate a punch from a boxer after a predetermined delay time has elapsed since the most recent simulated punch from that boxer.

Preferably, the display panel is operable by application of electrical signals to it to simulate knockouts. The operational circuit means transmits signals to the display panel to simulate knockdowns for different time durations determined by the operational circuit means, and a knockout is simulated when a knockdown lasts for a duration equal to or longer than a predetermined knockout duration. In the illustrated embodiment, the time duration determined by the operational circuit means for simulation of a knockdown is a function of the number of simulated hits previously detected.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
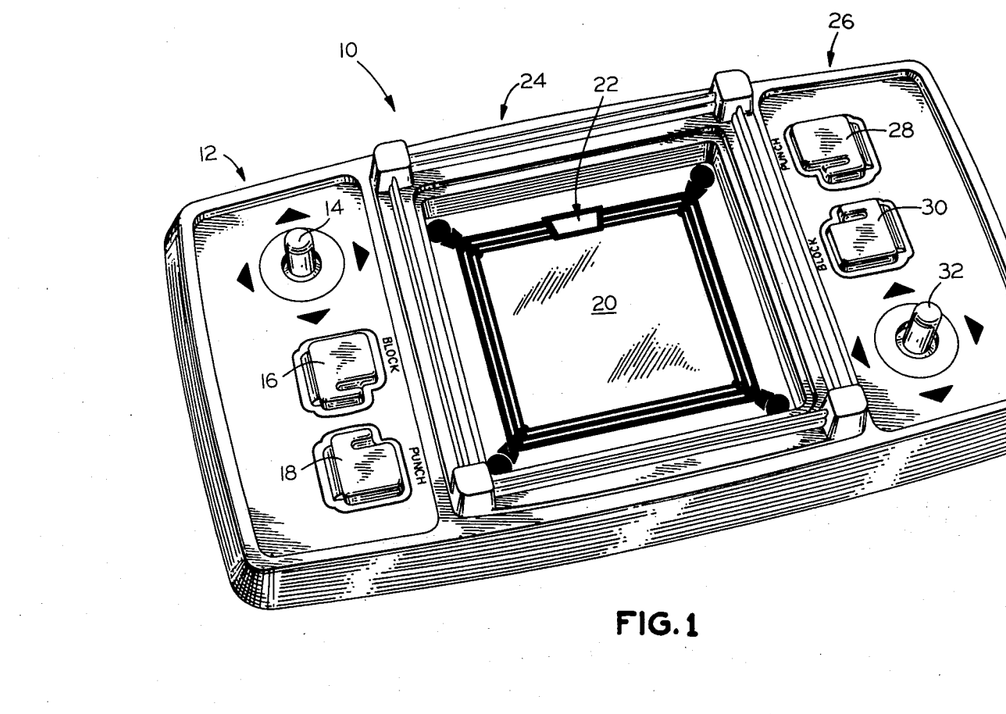
FIG. 1 is a perspective view of a device embodying the teachings of the present invention.

An electronic device for simulating a boxing match is illustrated in FIG. 1, which shows a housing 10 having opposing control panels 12 and 26 for controlling boxers whose movements are displayed in a simulated ring 20. The position of a boxer is represented by the activation of a body symbol 36 (FIG. 2), and the player can cause punches and blocks, which are simulated by activation of arm symbols 34 adjacent to the activated body symbol. FIG. 1 reveals that the central portion 24 includes not only simulated ring 20 but also a status display 22.

The game can be played in a one-player mode, in which control panel 12 is operative to control one of the boxers but the other boxer is controlled by the game circuitry. Forward pivoting of a four-position paddle switch 14 on control panel 12 causes one step of forward movement of the controlled boxer symbol. The paddle switch is a four-position switch of the type illustrated, for example, in U.S. patent application Ser. No. 232,808, filed Feb. 9, 1981, by Eric Bromley for an "Electronic Game Providing Formation Changes and Method" and hereby incorporated by reference. Rearward, left, and right operations of switch 14 cause rearward, left, and right one-step movements of the controlled symbol. Depression of punch button 18 results in a punch sequence in which an arm is simulated to extend and then retract, and repeated punches are caused by repeated operations of punch button 18. Operation of block button 16 causes simulation of an arm in a steady position, and the arm display continues so long as block button 16 is depressed and the block is not "knocked down" by a punch from the opposing boxer.

Figure 2:
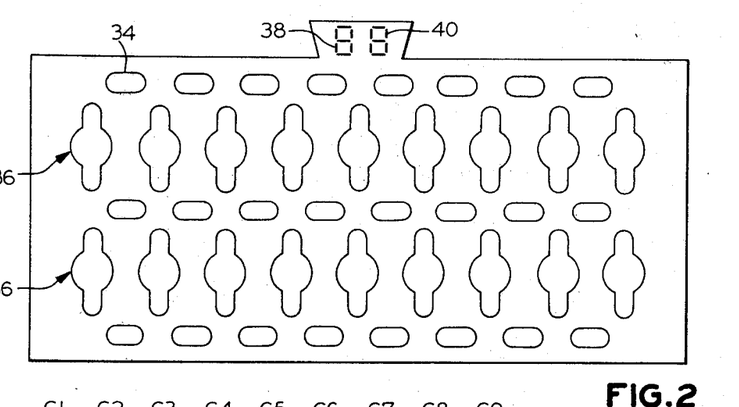
FIG. 2 is a layout of the light-emitting devices for simulating play action and providing a status display.

FIG. 2 shows the layout of visual-image-producing devices employed to provide the boxer symbols and to display status information. Two body rows 36 are provided, each row having nine visual-image-producing devices intended to suggest the appearance of the body of a boxer from above. The devices for representing the body portions are symmetrical and so can be used to simulate both boxers. (In practice, only the three central devices in each row are actually used for both boxers, because the boxers are prevented from coming within three positions of each other).

Associated with each body row is a pair of arm rows 34 that extend parallel to the associated body row. Since the two body rows share one arm row, three arm rows result. The visual-image-producing devices of the arm row are also symmetrical so that they can be used to simulate arms extending from both body symbols.

Also shown in FIG. 2 are two seven-segment digits 38 and 40 for status display 22.

Figure 3A:
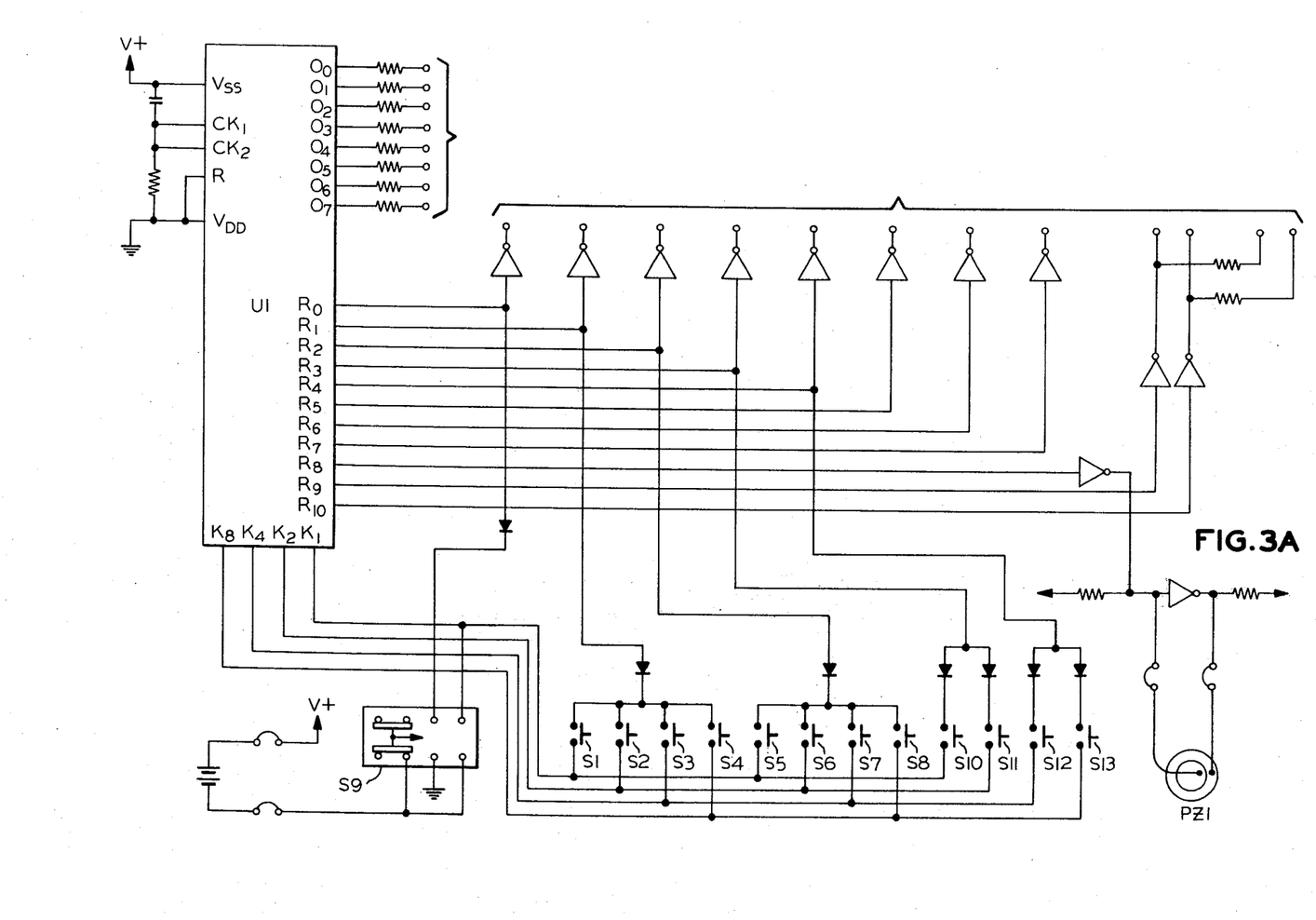
FIGS. 3A and 3B together form a schematic diagram of the circuitry employed in realizing the device.
Figure 3B:
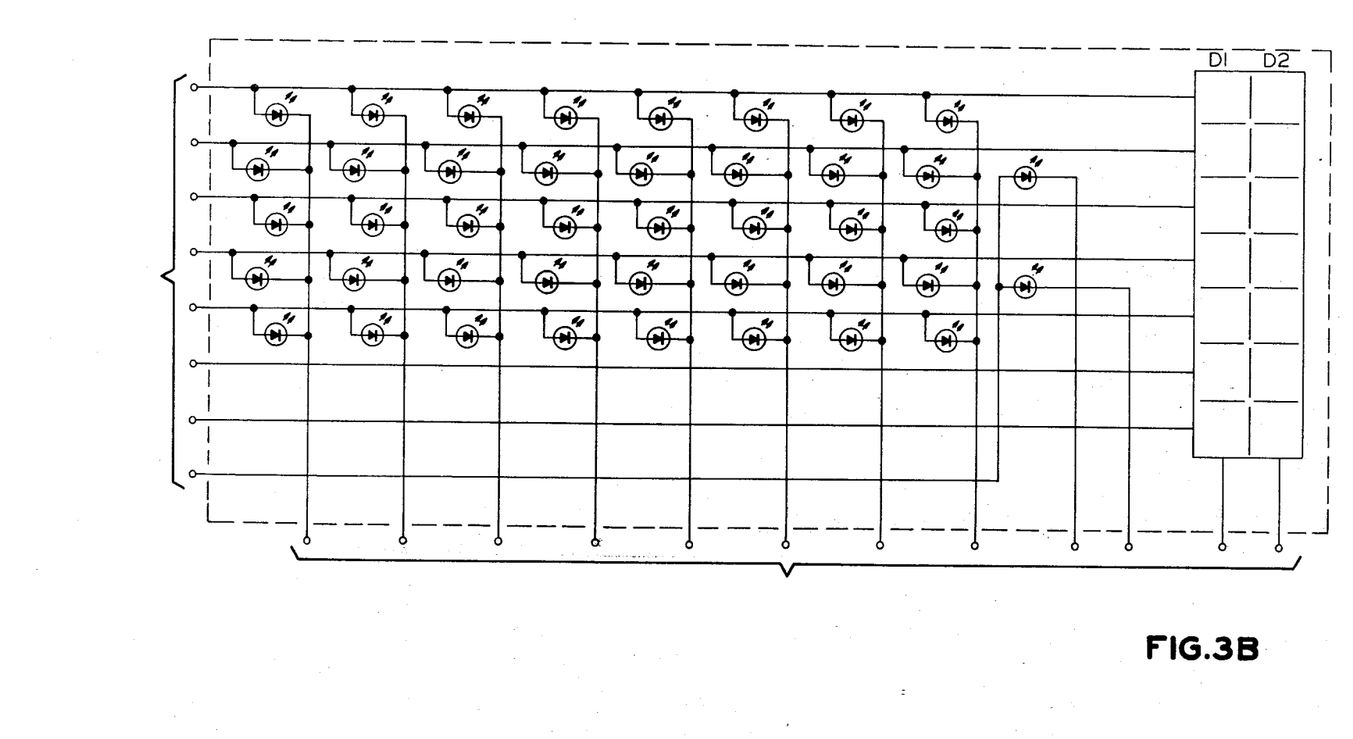

The circuitry for providing the various functions to be described below is shown in FIGS. 3A and 3B. The principal component is a microprocessor U1, which is a Texas Instruments TMS 1100 that has been programmed to provide the game action described below. It can be seen in the drawing that U1 is wired for timing and power application in a conventional manner, and its various terminals are also conventionally labeled. LEDs providing the nine-element body rows and the eight-element arm rows are shown in FIG. 3A electrically connected for operation by pairs of terminals of U1. Also connected for operation by the microprocessor are display digits D1 and D2, which are the seven-segment display digits 38 and 40 of FIG. 2. The remaining output device is a piezoelectric transducer PZ1. Inverter chips are employed to provide various inverters used by microprocessor U1 to drive the various output devices.

The "paddle switches" 14 and 32 (FIG. 1) are in actuality groups of four switches operated by a single lever. These two groups of four switches are represented in FIG. 3A by switches S1 through S8. The punch and block switches are represented by switches S10 through S13. A further switch, three-position switch S9, is located on the side of the housing and is not visible in FIG. 1. It applies power and selects one- or two-player operation. In the leftmost position of switch S9, it does not apply power to the circuitry. It connects the negative side of a battery to the circuit ground in its middle and right positions to turn the circuit on. The middle and leftmost positions are also connected for interrogation by microprocessor U1 to determine whether the one-player mode or the two-player mode has been selected.

A detailed discussion of the operation of the circuitry will not be presented here. Those skilled in the art will recognize the functions that can be performed by the various terminals of microprocessor U1. It will be recognized that the various input switches can be strobed by terminals R0-R4 and there positions read on input bus K1-K8. Those skilled in the art will also recognize that the LED matrix will be multiplexed so that apparently steady displays are actually provided by pulsing the various LEDs at a rate that is fast enough to be ignored by the human eye. Additionally, it has become commonplace for microprocessors to employ piezoelectric transducers such as PZ1 for tone generation by pulsing them at appropriate frequencies.

The functions provided by the device are described with reference to FIGS. 1-3 and the exemplary action described in FIGS. 4-16. The device is turned on when switch S9 (FIG. 3A) is operated to its middle or right position. It will be assumed in the following example that switch S9 has been operated to its right position to cause two-player operation, so both control panels will be operative.

Initial operation of switch S9 causes appropriate sound effects, and body symbols are displayed in the first column of the upper row of body symbols (FIG. 2) and the ninth column of the lower row. The player operating control panel 12 then operates his block button 16 or punch button 18 to initiate action. Operation of block button 16 results in a lower skill level in the one-player mode than operation of punch button 18 does, but it has no effect in the two-player mode. Operation of button 16 or 18 in the two-player mode is nonetheless necessary in the preferred embodiment because it causes action to begin.

Operation of the block or punch button causes the two body symbols to advance toward the center along their respective rows until one reaches column C4 and the other reaches column C6. At that point, the two intervening arm symbols in the middle arm row are activated momentarily to simulate the boxer' touching gloves. The boxers then return to their "corners," display digits 38 and 40 are operated to display "r 1," indicating that the first round is about to start, and an appropriate sound effect is made by transducer PZ1 to indicate the beginning of the round. The opposing players then take over control of the boxers, manipulating paddle switches 14 and 32 to maneuver them around the ring.

Figure 4:
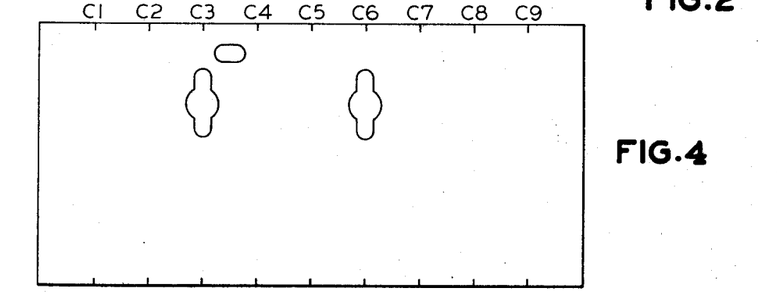
FIGS. 4-16 are diagrams illustrating representative action of the simulated match.
Figure 5:
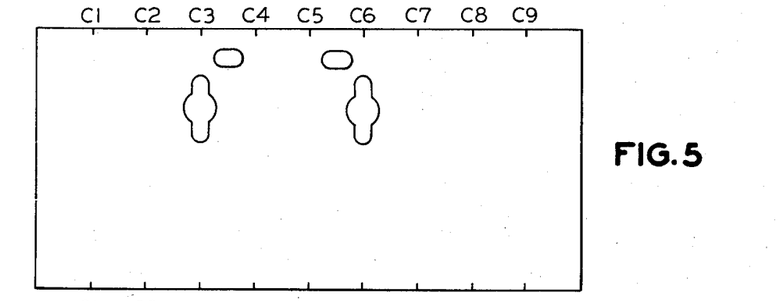
Figure 6:
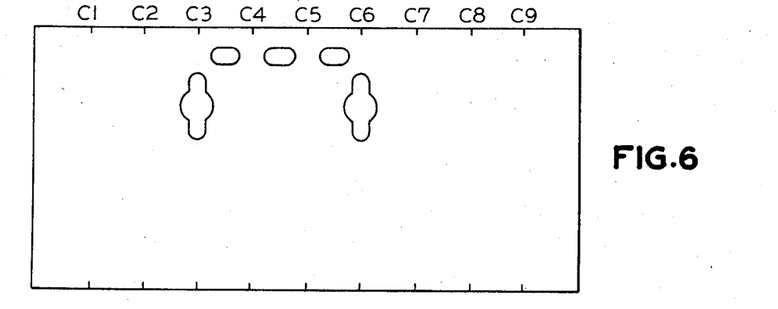

In the present example, it is assumed that the match has been underway for several rounds and that the players have manipulated their paddle switches to move the body symbols to the positions illustrated in FIG. 4. As FIG. 4 shows, the two body symbols are three positions apart—i.e., there are two positions between them—and this is as close as they are allowed to come. Operation of a paddle switch to cause one body symbol to move closer than that to the other body symbol results in no movement.

At the separation shown in FIG. 4, the boxers are within punching range of each other, and the player operating control panel 12 accordingly operates button 16 to cause block simulation. A block is simulated, as FIG. 4 shows, by activation of an LED adjacent to the left body symbol in the upper arm row representing the left boxer's left arm. Only one LED is activated, and it remains activated while the player keeps the block button depressed. In FIG. 4, the player controlling the boxer on the right has not depressed his block button, because he intends to throw a punch, and the microprocessor prevents simultaneous block and punch simulation by the same simulated boxer. Thus, a player must take a risk in order to throw a punch.

The player controlling the simulated boxer on the right depresses punch button 28. He only has to depress button 28 momentarily because the punch sequence continues to completion after the punch button has once been operated. The sequence begins in FIG. 5, where an LED is activated in the upper arm row representing the right arm of the left boxer. Simulation continues in FIG. 6, in which it is seen that a second LED is activated, partial extension of the arm thereby being simulated. However, the third LED in the sequence is already shown illuminated in FIG. 6 because the third LED is activated to represent the left boxer's block. Thus, a block is simulated by activation of an LED in the punching sequence, and this fact is detected by the microprocessor to register a successful block of a punch.

Figure 7:
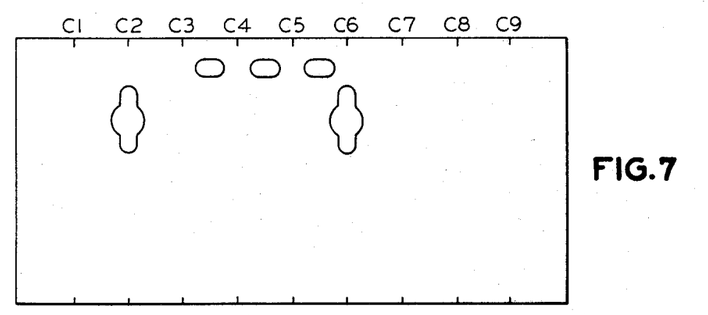
Figure 8:
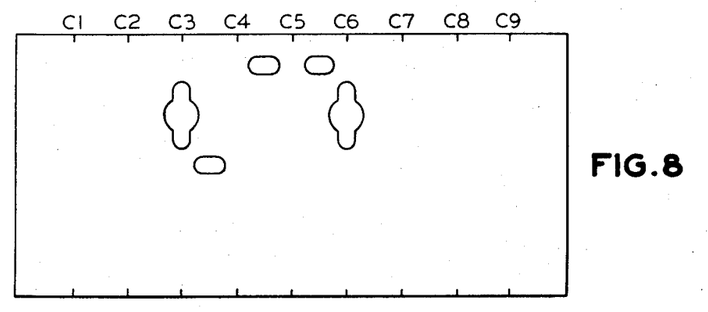

FIG. 7 shows the next part of the automatic sequence, where the punching arm is in full extension, the block is "knocked down," and the left boxer is knocked back by one column; i.e., although the punch has been successfully blocked, the blocking boxer is still knocked backward. Furthermore, his block has been knocked down, so he must release his block button 16 and depress it again if he wants to simulate a block. However, as FIG. 8 shows, the player controlling the left boxer sees an opening, and instead of replacing his block, he moves his boxer forward and depresses punch button 18 to cause a punch simulation. The first step of the punch simulation is shown in FIG. 8, which also shows that the punch sequence for the right boxer is in the phase in which retraction of the arm is being simulated. During this time, the right boxer is not able to block.

Figure 9:
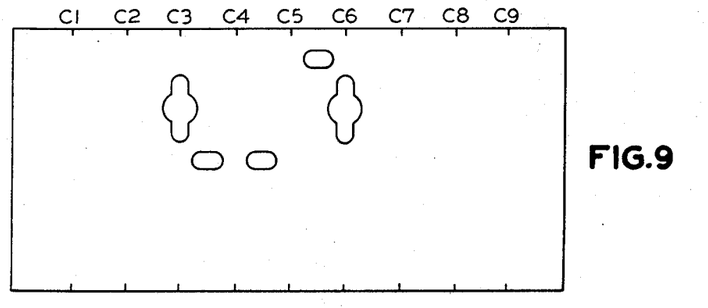
Figure 10:
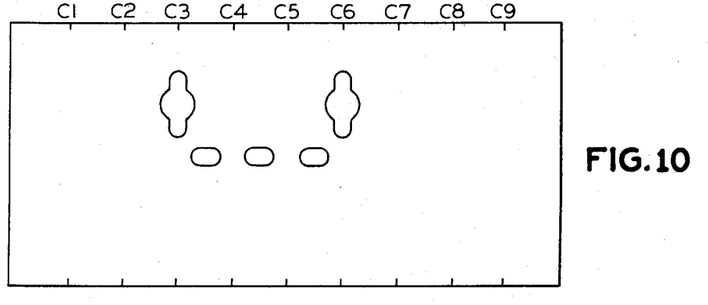

FIG. 9 shows the next step in both punching sequences; as the left boxer's arm continues forward, the right boxer's arm is retracting, and this action continues in FIG. 10, where the right boxer's arm is fully retracted but he has not put up his block. Accordingly, the microprocessor detects the presence next to the right boxer of an activated LED simulating a punch from the left boxer, and a hit is thereby recorded. As a result, the boxer that has been hit is moved backward automatically by the microprocessor and blinks to indicate that he is staggering, as FIG. 11 illustrates.

Figure 11:
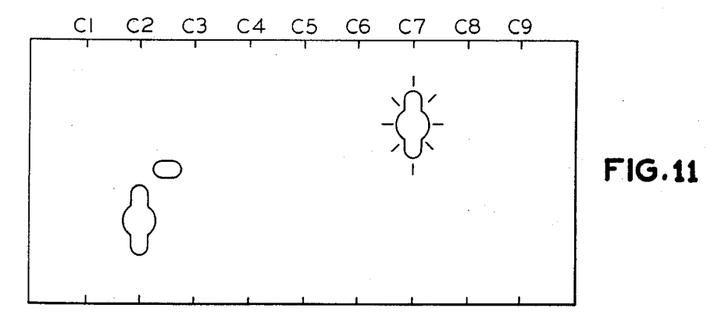
Figure 12:
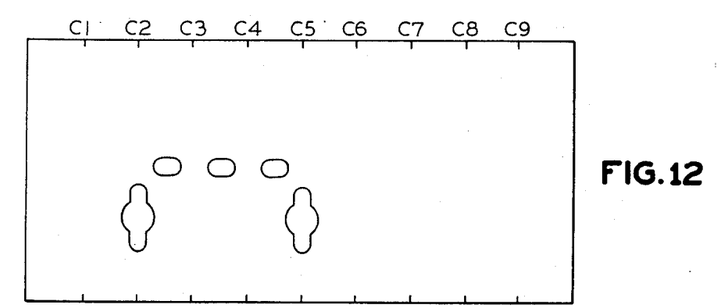
Figure 13:
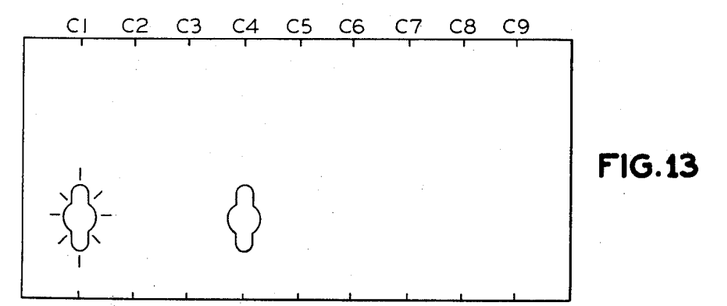

FIGS. 11-16 illustrate the action in a more condensed form, FIG. 11 showing the result of several moves by the player controlling the left boxer, who has retreated after his successful punch. The right boxer, undaunted by the previous blow, pursues the left boxer in FIG. 12. The player controlling the left boxer, intending to move out of the way, removes his finger from his block button because the microprocessor does not permit movement while a block is in position. However, the right boxer catches the left boxer with his guard down before he can move, and a hit is thereby scored against the left boxer, who is knocked back "against the ropes" and "staggers." This is seen in FIG. 13.

Still staggering, as shown by the blinking body symbol, the left boxer moves to the upper row. (The "stagger" simulation occurs automatically for a short time after a successful hit, but the player is still able to move the boxer while it is "staggering.") At this point, the right boxer throws another punch and scores another hit, but the left boxer is not knocked back this time, because he was already against the ropes. Since he has been hit a second time while still staggering from a first hit and has not landed a punch in return, the microprocessor award a knockdown.

A successful hit results in a knockdown in the illustrated embodiment only if the hit has been part of a combination. After the third round, a knockdown occurs whenever a boxer is hit a second time if it is still staggering from a first hit and it has not been able to land a hit in return between the two hits. The staggering lasts for about 1.1 seconds. Achieving a knockdown during the first three rounds is somewhat more difficult, the additional difficulty simulating that the boxers are in better physical condition during the early rounds. During the first three rounds, a boxer is simulated to be knocked down if it has been hit by a three-punch combination—i.e., three puches in a succession in which the second and third punches occur while the boxer is still staggering from the first and second punches, respectively—without scoring a hit in return. A knockdown also occurs during the first three rounds if the boxer is hit with two two-punch combinations and has not landed a punch during the intervening time.

Figure 14:
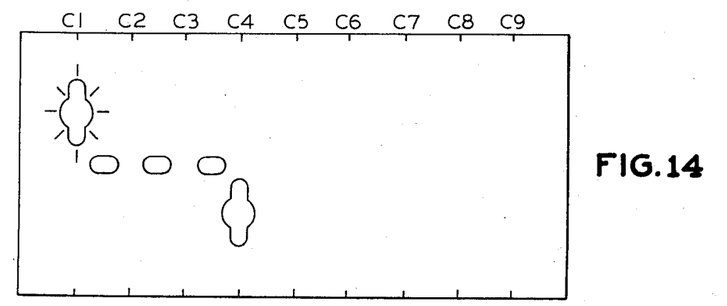
Figure 15:
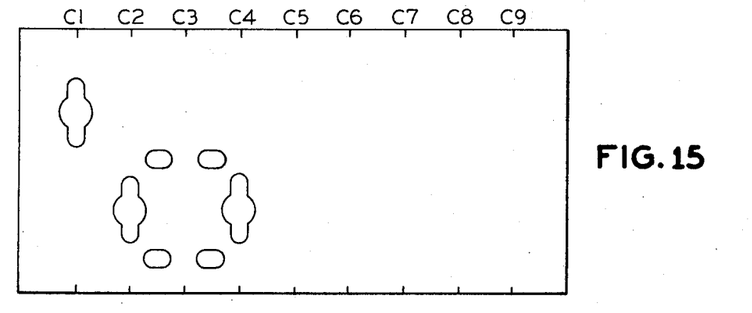

It is assumed for the present example that the action is taking place in one of the later rounds, and the combination illustrated in FIGS. 12–14 results in a knockdown. An appropriate sound effect is provided, and a third body symbol is activated with adjacent arm symbols, as FIG. 15 shows, to represent a referee in position to escort the standing boxer to his corner. The referee and standing-boxer body portions and arm symbols shown in FIG. 15 maintain the pattern shown there but advance to the right until the standing boxer has reached the corner. Then the referee body symbol and arm symbols disappear. At this point, the count begins, LED 40 displaying consecutive numbers to represent a count. During this time, the fallen boxer blinks at a slow rate, turning on and off with successive numbers on the display.

The length of the count varies as a function of the boxers' scores. During the action, the microprocessor monitors the action, keeping track of how many against an opponent's block, hits against an opponent's body, and knockdowns each boxer has scored. The circuitry awards half a point for a hit against a block, one point for a hit against a body, and three points for a knockdown. The only exception to this rule is that no points are awarded for any hit scored while the boxer being struck is staggering. To determine the count of the knockdown, the microprocessor subtracts the fallen boxer's score from the standing boxer's score, divides by two, and adds three to the result. If the resultant number is three or less, the count is set at three. If the result is between three and ten, the count is equal to the result, and if the result is ten or more, a knockout is simulated.

Figure 16:
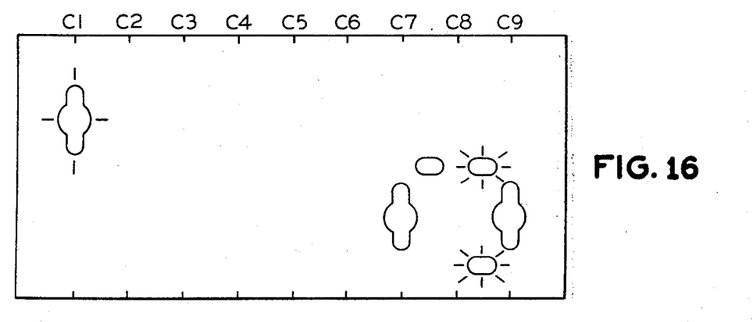

If the result is not a knockout, the count on the display stops and the display goes blank when the count number has been reached, and action continues as before. If the count reaches ten, however, the seven-segment display shows the round number, and the referee appears with one arm in front of the standing boxer as FIG. 16 illustrates to simulate the referee's raising the arm of the standing boxer, whose arms blink in triumph.

In the absence of a knockdown, action would have continued until a break at the end of the round. Each round lasts for about forty seconds. When the end of the round occurs, an appropriate sound effect is provided, the referee appears to escort to his corner the boxer farthest from his side of the ring while the other boxer returns to his corner unescorted.

The seven-segment display digits 34 and 36 then go through an end-of-round sequence. Initially, they display the symbol "r d." The score of the individual round is then displayed as the difference between the boxers' scores for the round. For this purpose, the scores are calculated as they were for determining knockdowns, with the exception that only the points accumulated during the most recent round are tabulated. The score is then shown as a hyphen for the boxer who lost the round and as the score difference for the boxer who won the round. If the score is greater than nine, only a nine is shown, there being only one digit in the display for this purpose. If the round has been a tie, two hyphens are displayed.

After the score for the individual round is displayed, the seven-segment digits show the number of rounds each boxer has won. Finally, the display shows the next round number, e.g., "r 5," and an appropriate sound effect signals the beginning of the next round.

At the end of the tenth round, the match is over. At that point, the score of the individual round is shown as before, as is the score in number of rounds won, but that score remains on display after the tenth round, and a victory indication is presented by a simulated arm-raising simular to that shown in FIG. 16. The winner is the boxer that has won the most rounds.

A review of the sequence of plays in FIGS. 3–16 shows that the boxers can only block with their left arms and punch with their right arms. Consequently, a boxer in his right row cannot punch a boxer in the other row. In his left row a boxer can punch an opponent in either row but he cannot block a punch from the other row with his left arm. However, he can throw a punch from his left row when the boxer in the other row has begun a punch and thereby cause the two punches to interfere. This will result in both boxers being pushed backwards, and no score will result.

The action in the one-player mode is quite similar to that in the two-player mode. The game is set to the one-player mode by operating switch S9 (FIG. 3A) to the middle position. The beginning sequence previously described is displayed and subsequent depression of button 16 or 18 indicates a low or high skill level.

After depression of one of the buttons to indicate the skill level, the boxers march to the center of the ring to touch gloves and then return to their corners while the display flashes the round number. Unlike the display in the two-player mode, however, the display of the round number in the one-player mode is followed by display of a code "L1" if the lower skill level has been selected and "L5" if the higher skill was picked. The action then begins as it does in the two-player mode with the exception that the right boxer is an "automaton," being controlled by the computer rather than by a human player.

The microprocessor calculates the motion of the boxer on the right in such a manner that it is unpredictable to the human operator and has the effect of simulating the motion of a real boxer. In operation, the microprocessor executes a program having the general form of a loop that is executed many times in a single second. As it progresses through the loop, the microprocessor performs a succession of routines that are involved with various aspects of game operation. One of these routines determines the motions of the automaton. On each cycle through the main loop, the program enters the automaton-movement routine and executes a small part of it before leaving the routine and continuing through the loop. On the next cycle through the loop, execution of the routine resumes at the point where it was discontinued during the previous cycle. As a result, each execution of the routine lasts for a duration that is noticeable to a human being even though the time taken to cycle through the main loop is negligible in human terms.

The automaton-movement routine begins by determining how close the two boxers are. If the boxers are more than four spaces apart, a closing routine is entered that causes the automaton to gravitate toward the human-controlled boxer. The routine includes a probablistic element, using a random-number routine to produce a pseudo-random number that is compared with a fixed number that determines the relative probabilities of the possible outcomes. The effect of this comparison in one-eighth of the instances in which the closing routine is called is not to direct the automaton to do anything throughout the remainder of the closing routine. Since the closing routine includes a timed delay, the result is that there is a perceptible hesitation of the automaton that lasts until the closing routine has been completed.

In the other seven-eighths of the instances in which the closing routine is called, the automaton is directed to lower its block. The effect of the various commands from the automaton-motion routine is the same as directions to a human player operating the control elements on a control panel. Accordingly, this command is the equivalent of a command to release the block button, and it has no effect if the block is not currently being displayed.

If the decision has been to release the block instead of merely doing nothing, the routine also makes a further decision whose result in nine-sixteenths of the instances in which this branch of the routine is followed is to direct the boxer to move forward and then issue no more commands until the end of the current closing routine. In the other seven-sixteenths of the instances, the automaton is directed either to move backward or to switch rows, the backwards move occurring one-quarter of the time and the row change occurring the other three-quarters of the time. In either case, no further commands are issued until the end of the current closing routine.

Accordingly, if the microprocessor determines that the automaton is more than four positions from the player-controlled boxer, the automaton will move forward about half the time, but it may also switch rows, move backwards, or just do nothing; in other words, the automaton "dances."

Once the closing routine has been completed, the automaton-motion routine again determines how close the two simulated boxers are, and it may again choose the closing routine. If the boxers are only three or four positions apart, on the other hand, the microprocessor will enter an offense routine if the player-controlled boxer is not punching and a defense routine if it is. In the offense routine, pseudo-random numbers are again employed to choose between different courses of action. In three-eighths of the instances in which the offense routine is chosen, the block will be ordered to be set and no other orders will issue until the offense routine is finished. The instruction to set the block causes the microprocessor to keep the block in position until a further instruction directs that it be dropped or until it is hit by a punch from the player's boxer.

In the remaining instances in which the offense routine is called, further decisions are made in a probabilistic manner. In half of these instances, the automaton will be directed to match rows with the human-controlled boxer, drop the block, and punch. In the other half of these instances, it will be directed to drop the block, move left, and punch. Of course, no movement results when the row-matching branch has been chosen if the boxers already are in the same row, and movement to match rows also will not occur if the block is set when the row-matching command is reached. On the other hand, in those instances in which the automaton is directed to move left, it always moves left if it is in the right row because the command to drop the block precedes the command to move.

After the punch has been thrown, the automaton chooses on a fifty-fifty basis between moving forward and staying in position until the end of the offense routine.

When the offense routine is completed, the automaton-movement program again determines which routine is to be executed and enters the selected routine. If the microprocessor determines that the automaton is three or four positions away from the human-controlled boxer and that the human-controlled boxer is punching, it enters into the defense routine. In five-eighths of the instances in which the defense routine is called, the automaton is directed to move to its right and put up its block, and it is then given no more commands until the end of the defense routine. In the other three-eighths of the instances in which the defense routine is called, it chooses between merely putting up the automaton's block on the one hand and directing the automaton to move back two spaces and raise its block on the other hand. The latter choice is made three out of four times. Whichever choice is made, no further commands are issued until the end of the defense routine.

In addition to the three routines just described, namely, the closing routing, the offense routine, and the defense routine, there is a counterpunch routine that is reached whenever the human-controlled boxer hits the automaton's block. This routine is not part of the automaton-motion routine that is called during every cycle through the main loop, but it takes precedence over that routine. In three-eighths of the instances in which the counterpunch routine is called, it issues no direction to the automaton; it merely provides a programmed delay. In the other five-eighths of the instances in which the counterpunch routine is called, the automaton is directed to punch and move forward with no intervening delay. Since the boxers can move while punching, the automaton moves forward one step and punches at the same time. The programmed delay then occurs, after which control is relinquished by the punch routine.

As was briefly mentioned above, all of the automaton-motion routines have human-scaled delays programmed into them. These delays prevent the automaton from being "too good." It is the length of these delays that is affected by the skill-level setting; a higher skill level results in a shorter delay.

It should be noted in the foregoing strategies that the automaton has a tendency to move to the right on defense and to the left on offense. The reason for this can be appreciated when the "handedness" of the simulated boxers is considered. Both boxers punch with their right arms and block with their left arms. Consequently, a boxer making a defensive move may tend to move to the right because he can be hit in his right row only if his opponent is in the same row (his opponent's left row). On the other hand, a boxer making an offensive move will tend to move toward his left because he can punch into both rows from his left row but can only punch into high right row when he is in his right row. Thus, an element of strategy results from the handedness of the boxers and the provision of more than one row.

The rounds in the one-player mode are of the same length as the rounds in the two-player mode. At the end of a round, the change-of-round display is substantially the same, but an indication of the level at which the automaton is to fight (e.g., "3") is displayed after the number of the new round. The skill level selected is one of eight levels that can be provided by the microprocessor. The selection made by the player at the beginning of the game determines a range of skill levels. If he selects the lower range, the microprocessor will initially assign the lowest skill level, L1, to the automaton, and the duration of the delays built into the routines for the automaton motion will be the greatest. The microprocessor keeps track of the score difference during a round and increases the automaton's skill level (i.e., it reduces the delay duration) if the human operator has outstripped it by too many points. The converse is not true, however, and the automaton's skill level remains high during a round even if it is beating the player-controlled boxer very badly. A downward adjustment in the skill level of the automaton is only made between rounds, when the automaton shifts down one level if its score is greater than the human player's score. The level will shift up by one for every two points by which the human operator is beating the automaton. Of course, no upward adjustment is made if the automaton has reached the upper end of its skill range.

The rules for punches, knockdowns, knockouts, and scoring in the one-player mode are the same as those for the two-player mode. The two modes therefore appear substantially the same in operation, the only apparent differences being the auotmatic operation of the automaton and the skill-level display in the one-player mode.

It is apparent from the foregoing description that considerable play value is provided by this device. The operator has control not only over punching but also over blocking, and the player can manually control the position of his boxer in two dimensions. Furthermore, the punching and blocking are provided at different sides of the boxer symbol, a feature that contributes to the strategy by causing different sides of the ring to be favored in different situations. Furthermore, by requiring that blocking cannot be simulated simultaneously with punching or moving, the device enhances the play value of the blocking feature because blocking must be used selectively.

Having thus described the invention, we claim:

1. A self-contained electronic device for simulating a boxing match or the like to be played within a specified time period comprising:
   a. a housing;
   b. a display panel on said housing providing a visual simulation of a boxing ring and operable by application of electrical signals thereto to display a pair of opposing boxer symbols, each of said boxer symbols including a body portion, and to display at least one arm symbol for each of said boxer symbols and extending from said body portions thereof, said display of arm symbols being in both punching and blocking modes, said display panel being operable by application of electrical signals thereto to simulate knockdowns and knockouts of a simulated boxer symbol;
   c. status-information means in said housing and operable by application of electrical signals thereto to display status information;
   d. operational circuit means in said housing and electrically connected to said display panel for application of electrical signals thereto, said operational circuit means being operable to transmit electrical signals to said display panel to display said body portions of said boxer symbols, to move them about said simulated ring, and to display said arm symbols extending from said body portions of each of said boxer symbols in said punching mode and from at least one of said body portions in said blocking mode, said operational circuit means detecting a simulated hit on the body portion of one boxer symbol by the arm symbol of another boxer symbol during a simulated punch to detect a simulated hit and transmit signals to said display panel to present an indication of the simulated hit, said operational circuit means detecting the simulated interruption of a punching arm symbol from a boxer symbol by a blocking arm symbol from another boxer symbol to prevent display of a simulated hit, said operational circuit means includes knockdown and knockout signal generating means transmitting electrical signals to said display panel for simulation of a knockdown and of a knockout of a boxer symbol, said operational circuit means including knockdown determining means operable only if a predetermined number of hits have been scored on a simulated boxer symbol within a predetermined time duration distinct from said specified time period to effect transmission of said electrical signals to said display panel for simulation of a knockdown, said operational circuit means additionally including knockout determining means operable to cause transmission of electrical signals to said display panel for simulation of a knockout of that boxer symbol, said operational circuit means also being electrically connected to said status-information means for transmission of signals thereto, said operational circuit means monitoring the simulated action to record information concerning the status of the simulated match and to transmit signals to said status-information means to display said status information;
   e. manually operable control elements electrically connected to said operational circuit means for transmission of electrical signals thereto upon manual operation of said manually operable control elements by a player of the game to operate said operational circuit means to move at least one of said boxer symbols about said simulated ring under manual control of the player, to display an arm of said last-mentioned boxer symbol in said punching mode under manual control of the player, and to display an arm of said last-mentioned boxer symbol in said blocking mode under manual control of the player, the player thereby being able to move a boxer symbol about said simulated ring under manual control to selectively cause simulated punches and blocks by the controlled boxer symbol.

2. The electronic device of claim 1 wherein said display panel is operable to display left and right arm symbols for each boxer symbol in separate positions relative to said body portion thereof to simulate left and right arms, and said arm signal generating means of said operational circuit means transmits signals to said panel to produce said simulated arm symbols.

3. The electronic device of claim 2 wherein one of said left and right arm symbols of each boxer symbol is displayed only in said punching mode and the other of said left and right arm symbols is displayed only in said blocking mode.

4. The electronic device of claim 3 wherein said operational circuit means prevents display of arm symbols of a single boxer in both said punching and blocking modes simultaneously.

5. The electronic device of claim 1 wherein said display panel includes a body row of visual-image-producing devices and a pair of arm rows of visual-image-producing devices disposed on opposite sides of said body row and extending substantially parallel thereto, said operational circuit means being operable to activate said visual-image-producing devices in said body row for simulation of body portions of said boxer symbols and also being operable to activate visual-image-producing devices in said arm rows adjacent activated visual-image-producing devices in said body row to simulate arms of the simulated boxers whose body portions are simulated by said activated visual-image-producing devices of said body row, and wherein said operational circuit means transmits signals to said display panel to activate visual-image-producing devices of said arm rows adjacent activated visual-image-producing devices of said body row to simulate punches and blocks by the boxers whose body portions are simulated by the activated devices of said body row, said operational circuit means detecting the activation, adjacent one boxer's body portion, of visual-image-producing devices simulating punches from the other simulated boxer to detect simulated hits on said one simulated boxer.

6. The electronic device of claim 5 wherein punches are simulated by activation of a sequence of adjacent visual-image-producing devices in an arm row and blocks are simulated by activation of at least one visual-image-producing device in an arm row.

7. The electronic device of claim 6 wherein said control panel includes at least one punch button and one block button, an arm symbol being displayed in said punching mode momentarily in response to each operation of said punch button, an arm symbol being displayed in said blocking mode continuously during continuous depression of said block button at least until successful blocking of a punch.

8. The electronic device of claim 5 wherein punches are simulated by activation of a sequence of adjacent visual-image-producing devices in an arm row, wherein blocks are simulated by activation of at least one visual-image-producing device in an arm row, and wherein said operational circuit means detects a blocked punch by detecting the activation of a visual-image-producing device simulating a block in a sequence of visual-image-producing devices simulating a punch.

9. The electronic device of claim 1 wherein said operational circuit means only transmits signals to said display panel to simulate a punch from a boxer after a predetermined delay time has elapsed since the most recent simulated punch from that boxer.

10. The electronic device of claim 1 wherein said knockdown determining means of said operational circuit means is operable to transmit signals to simulate a knockdown of a boxer only if the predetermined number of hits have been scored against that boxer within said predetermined time without a hit on the other boxer being scored.

11. The electronic device of claim 1 wherein said display panel is operable by application of electrical signals thereto to simulate knockouts, wherein said operational circuit means transmits signals to said display panel to simulate knockdowns for differing time durations determined by said operational circuit means, said operational circuit means including means for determining a variable time duration for a simulated knockdown, and means for comparing the determined knockdown time duration with a predetermined knockout time duration whereby a knockout is simulated when a knockdown lasts for a duration equal to or longer than a predetermined knockout duration.

12. The electronic device of claim 11 wherein said time duration determining means of said operational circuit means for simulation of a knockdown is responsive to the number of simulated hits previously detected by said operational circuit means.

13. The electronic device of claim 1 wherein said operational circuit means transmits signals to said display panel to simulate knockdowns for differing time durations determined by said operational circuit means, said operational circuit means including means for determining a variable time duration for a simulated knockdown, and means for comparing the determined knockdown time duration with a predetermined knockout time duration whereby a knockout is simulated when a knockdown lasts for a duration equal to or longer than a predetermined knockout duration.

14. The electronic device of claim 13 wherein the time duration determined by said operational circuit means for simulation of a knockdown is a function of the number of simulated hits previously detected.

15. The electronic device of claim 1 wherein said control panel includes at least one punch button and one block button, an arm being displayed in said punching mode momentarily in response to each operation of said punch button, an arm symbol being displayed in said blocking mode continuously during continuous depression of said block button at least until successful blocking of a punch.

16. The electronic device of claim 1, 2, or 15 wherein said operational circuit means prevents display of arm symbols of a single boxer in both said punching and blocking modes simultaneously.

17. The electronic device of claim 1 wherein said display panel is operable by application of electrical signals thereto to display a referee symbol having a body portion and said operational circuit means is operable to transmit electrical signals to said display panel to display said body portion of said referee symbol and move said referee symbol about said simulated ring.

18. The electronic device of claim 17 wherein said display panel is operable by application of electrical signals thereto to simulate the end of the simulated boxing match and said referee symbol raising the arm of the winning boxer and wherein said operational circuit means transmits electrical signals to said display panel for simulation of the end of the boxing match and the referee raising the arm of the winning boxer.

19. A self-contained electronic device for simulating a boxing match or the like comprising:
    a. a housing;

b. a display panel on said housing providing a visual simulation of a boxing ring and operable by application of electrical signals thereto to display a pair of opposing boxer symbols and a referee symbol, each of said symbols including a body portion, and to display at least one arm symbol extending from said body portion thereof in a punching mode, said display panel being operable by application of electrical signals thereto to simulate the end of a round of boxing and said referee symbol escorting one of said boxer symbols to a corner of the boxing ring;

c. status-information means in said housing and operable by application of electrical signals thereto to display status information;

d. operational circuit means in said housing and electrically connected to said display panel for application of electrical signals thereto, said operational circuit means being operable to transmit electrical signals to said display panel to display said body portions of said rferee and boxer symbols, to move them about said simulated ring, and to display said arm symbols extending from said body portions of each of said boxer symbols in said punching mode, said operational circuit means detecting a simulated hit on the body portion of one boxer symbol by the arm symbol of another boxer symbol during a simulated punch to detect a simulated hit and transmit signals to said display panel to present an indication of the simulated hit, said operational circuit means including means for determining the end of a simulated round, said operational circuit means transmitting electrical signals to said display panel for simulation of the end of the round and said referee escorting one of said boxer symbols, said operational circuit means also being electrically connected to said status-information means for transmission of signals thereto, said operational circuit means monitoring the simulated action to record information concerning the status of the simulated match and to transmit signals to said status-information means to display said status information;

e. manually operable control elements electrically connected to said operational circuit means for transmission of electrical signals thereto upon manual operation of said manually operable control elements by a player of the game to operate said operational circuit means to move at least one of said boxer symbols about said simulated ring under manual control of the player, to display an arm of said last-mentioned boxer symbol in said punching mode under manual control of the player, the player thereby being able to move a boxer symbol about said simulated ring under manual control to selectively cause simulated punches by the controlled boxer symbol.

20. The electronic device of claim 19, wherein said operational circuit means transmits signals to said display panel to simulate the end of the round and said referee symbol escorting one of said boxer symbols a predetermined time period after the beginning of the round.

21. The electronic device of claim 19 wherein said display panel is operable by application of electrical signals thereto to simulated a knockout of a simulated boxer symbol and wherein said operational circuit means transmits electrical signals to said display panel for simulation of the knockout and display of said referee symbol indicating the winning boxer.

22. The electronic device of claim 19 wherein said display panel is operable by application of electrical signals thereto to simulate a knockout of one of said simulated boxer symbols and the appearance of said referee symbol in front of the other of said simulated boxer symbols, being the standing boxer, to simulate the referee's raising the arm of said standing boxer in triumph and wherein said operational circuit means transmits electrical signals to said display panel for simulation of the knockout of one of said simulated boxer symbols and the appearance of said referee symbol in front of the standing boxer to simulate the referee's raising the arm of the standing boxer in triumph.

23. The electronic device of claim 19 wherein said display panel is operable by application of electrical signals thereto to simulate the end of the simulated boxing match and said referee symbol raising the arm of the winning boxer and wherein said operational circuit means transmits electrical signals to said display panel for simulation of the end of the boxing match and the referee raising the arm of the winning boxer.

24. A self-contained electronic device for simulating a boxing match or the like comprising:
a. a housing;
b. a display panel on said housing providing a visual simulation of a boxing ring and operable by application of electrical signals thereto to display a pair of opposing boxer symbols, each of said boxer symbols including a body portion, and to display arm symbols of said boxer symbols extending from said body portions, said display of arm symbols being in both punching and blocking modes, said display panel being operable by application of electrical signals thereto to display a referee symbol having a body portion and to simulate the end of a round of boxing and the escorting of one of said boxer symbols to a corner of the boxing ring by said referee symbol;
c. status-information means in said housing and operable by application of electrical signals thereto to display status information;
d. operational circuit means in said housing and electrically connected to said display panel for application of electrical signals thereto, said operational circuit means being operable to transmit electrical signals to said display panel to display said body portions of said boxer symbols, to move them about said simulated ring, and to display said arm symbols extending from said body portions of said boxer symbols in said punching mode and from at least one of said body portions in said blocking mode, said operational circuit means detecting a simulated hit on the body portion of one boxer symbol by the arm symbol of another boxer symbol during a simulated punch to detect a simulated hit and transmit signals to said display panel to present an indication of the simulated hit, said operational circuit means detecting the simulated interruption of a punching arm symbol from a boxer symbol by a blocking arm symbol from another boxer symbol to prevent display of a simulated hit, said operational circuit means being operable to transmit electrical signals to said display panel to display said body portion of said referee symbol and move said referee symbol about said simulated ring and further being operable to transmit said electrical signals to said display panel for simulation of the end of the round and said escorting of one of said boxer symbols by said referee symbol, said operational circuit means also being electrically connected to said status-information means for transmission of signals thereto, said operational circuit means monitoring the simulated action to record information concerning the status of the simulated match and to transmit signals to said status-information means to display said status information;

e. manually operable control elements electrically connected to said operational circuit means for transmission of electrical signals thereto upon manual operation of said manually operable control elements by a player of the game to operate said operational circuit means to move at least one of said boxer symbols about said simulated ring under manual control of the player, to display an arm of said last-mentioned boxer symbol in said punching mode under manual control of the player, and to display an arm of said last-mentioned boxer symbol in said blocking mode under manual control of the player, the player thereby being able to move a boxer symbol about said simulated ring under manual control to selectively cause simulated punches and blocks by the controlled boxer symbol.

25. A self-contained electronic device for simulating a boxing match or the like comprising:

a. a housing;

b. a display panel on said housing providing a visual simulation of a boxing ring and operable by application of electrical signals thereto to display a pair of oppposing boxer symbols, each of said boxer symbols including a body portion, and to display arm symbols of said boxer symbols extending from said body portions, said display of arm symbols being in both punching and blocking modes, said display panel being operable by application of electrical signals thereto to display a referee symbol having a body portion and to simulate a knockout of a simulated boxer symbol with the referee symbol indicating the winning boxer symbol;

c. status-information means in said housing and operable by application of electrical signals thereto to display status information;

d. operational circuit means in said housing and electrically connected to said display panel for application of electrical signals thereto, said operational circuit means being operable to transmit electrical signals to said display panel to display said body portions of said boxer symbols, to move them about said simulated ring, and to display said arm symbols extending from said body portions of said boxer symbols in said punching mode and from at least one of said body portions in said blocking mode, said operational circuit means detecting a simulated hit on the body portion of one boxer symbol by the arm symbol of another boxer symbol during a simulated punch to detect a simulated hit and transmit signals to said display panel to present an indication of the simulated hit, said operational circuit means detecting the simulated interruption of a punching arm symbol from a boxer symbol by a blocking arm symbol from another boxer symbol to prevent display of a simulated hit, said operational circuit means being operable to transmit electrical signals to said display panel to display said body portion of said referee symbol and move said referee symbol about said simulated ring, said operational circuit means being operable to transmit electrical signals to said display panel for simulation of a knockout and of said referee symbol indicating the winning boxer, said operational circuit means also being electrically connected to said status-information means for transmission of signals thereto, said operational circuit means monitoring the simulated action to record information concerning the status of the simulated match and to transmit signals to said status-information means to display said status information;

e. manually operable control elements electrically connected to said operational circuit means for transmission of electrical signals thereto upon manual operation of said manually operable control elements by a player of the game to operate said operational circuit means to move at least one of said boxer symbols about said simulated ring under manual control of the player, to display an arm of said last-mentioned boxer symbol in said punching mode under manual control of the player, and to display an arm of said last-mentioned boxer symbol in said blocking mode under manual control of the player, the player thereby being able to move a boxer symbol about said simulated ring under manual control to selectively cause simulated punches and blocks by the controlled boxer symbol.

26. A self-contained electronic device for simulating a boxing match or the like comprising:

a. a housing;

b. a display panel on said housing providing a visual simulation of a boxing ring and operable by application of electrical signals thereto to display a pair of opposing boxer symbols, each of said boxer symbols including a body portion, and to display arm symbols of said boxer symbols extending from said body portions, said display of arm symbols being in both punching and blocking modes, said display panel being operable by application of electrical signals thereto to display a referee symbol having a body portion and to simulate a knockout of one of said simulated boxer symbols and the appearance of said referee symbol in front of the other of said simulated boxer symbols, being the standing boxer, to simulate the referee's raising the arm of said standing boxer in triumph;

c. status-information means in said housing and operable by application of electrical signals thereto to display status information;

d. operational circuit means in said housing and electrically connected to said display panel for application of electrical signals thereto, said operational circuit means being operable to transmit electrical signals to said display panel to display said body portions of said boxer symbols, to move them about said simulated ring, and to display said arm symbols extending from said body portions of said boxer symbols in said punching mode and from at least one of said body portions in said blocking mode, said operational circuit means detecting a simulated hit on the body portion of one boxer symbol by the arm symbol of another boxer symbol during a simulated punch to detect a simulated hit and transmit signals to said display panel to present an indication of the simulated hit, said operational circuit means detecting the simulated interruption of a punching arm symbol from a boxer symbol by a blocking arm symbol from another boxer symbol to prevent display of a simulated hit, said operational circuit means being operable to transmit electrical signals to said display panel to display said body portion of said referee symbol and move said referee symbol about said simulated ring and to transmit signals to said display panel for simulation of the knockout of one of said simulated boxer symbols and the appearance of said referee symbol in front of the standing boxer to simulate the referee's raising the arm of the standing boxer in triumph, said operational circuit means also being electrically connected to said status-information means for transmision of signals thereto, said operational circuit means monitoring the simulated action to record information concerning the status of the simulated match and to transmit signals to said status-information means to display said status information;

e. manually operable control elements electrically connected to said operational circuit means for transmission of electrical signals thereto upon manual operation of said manually operable control elements by a player of the game to operate said operational circuit means to move at least one of said boxer symbols about said simulated ring under manual control of the player, to display an arm of said last-mentioned boxer symbol in said punching mode under manual control of the player, and to display an arm of said last-mentioned boxer symbol in said blocking mode under manual control of the player, the player thereby being able to move a boxer symbol about said simulated ring under manual control to selectively cause simulated punches and blocks by the controlled boxer symbol.

* * * * *